(No Model.) 2 Sheets—Sheet 1.

T. O. POTTER.
SUSPENDER BUCKLE.

No. 353,812. Patented Dec. 7, 1886.

WITNESSES.
Fred. B. Dolan
J. M. Dolan

INVENTOR.
Thos. O. Potter
by his attys
Charles & Raymond (No Model.) 2 Sheets—Sheet 2.
T. O. POTTER.
SUSPENDER BUCKLE.
No. 353,812. Patented Dec. 7, 1886.
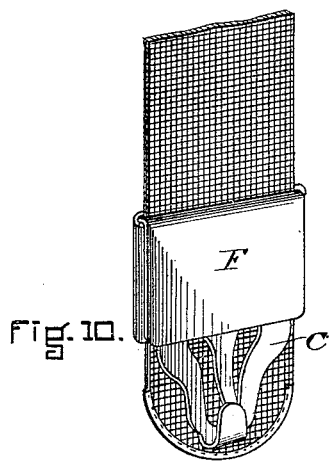
Fig. 10.
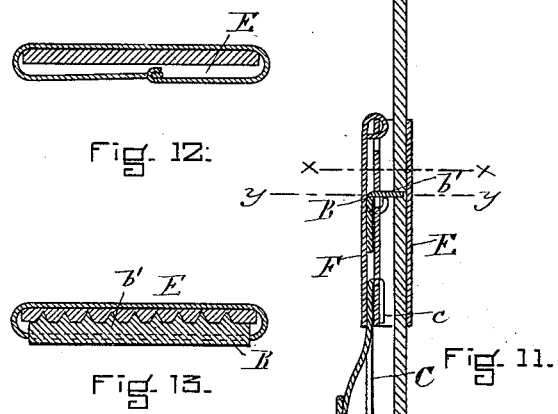
Fig. 12.
Fig. 13.
Fig. 11.
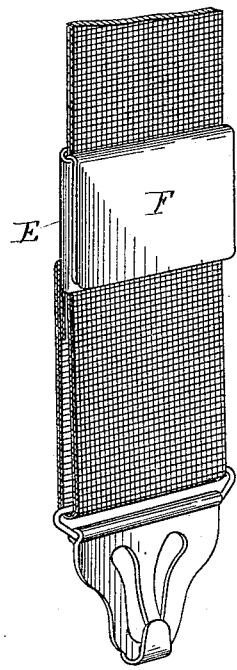
Fig. 14.
Fig. 15.
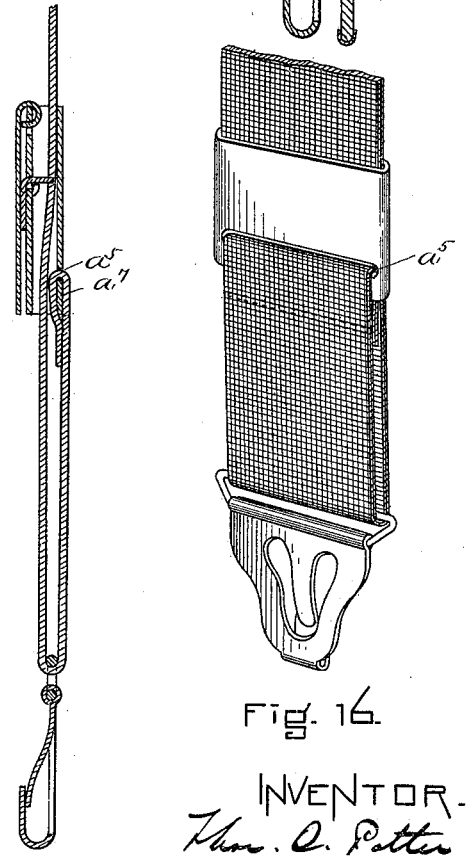
Fig. 16.
WITNESSES.
Fred. B. Dolan
J. M. Dolan
INVENTOR.
Thos. O. Potter
by his attys
Clarke & Raymond
N. PETERS, Photo-Lithographer, Washington, D. C.

UNITED STATES PATENT OFFICE.

THOMAS O. POTTER, OF BOSTON, MASSACHUSETTS.

SUSPENDER-BUCKLE.

SPECIFICATION forming part of Letters Patent No. 353,812, dated December 7, 1886.

Application filed June 28, 1886. Serial No. 206,384. (No model.)

*To all whom it may concern:*

Be it known that I, THOMAS O. POTTER, of Boston, in the county of Suffolk and State of Massachusetts, a citizen of the United States, have invented a new and useful Improvement in Buckles, of which the following is a full, clear, and exact description, reference being had to the accompanying drawings, forming a part of this specification, in explaining its nature.

The invention relates, especially, to a suspender-sleeve adapted either to carry or support a hook, or to form a clasp, or means whereby the end of a suspender-strap is secured to the remainder of the strap, in order to provide the strap with an adjustment as to length; and it comprises a sleeve supporting a jaw, and also a hook, if desired, and having a hinged plate which covers the jaw and the upper edge of the hook when used, and so that they are concealed from view and their edges prevented from coming in contact with the clothing and wearing it.

Figure 1:
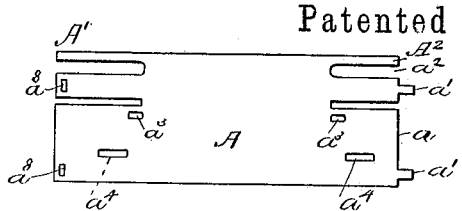
Figure 2:
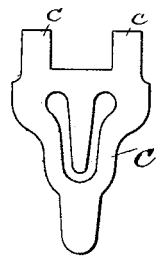
Figure 3:
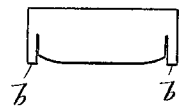
Figure 4:
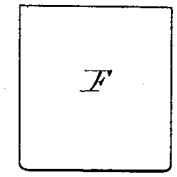
Figure 18:
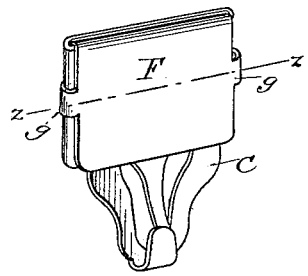
Figure 5:
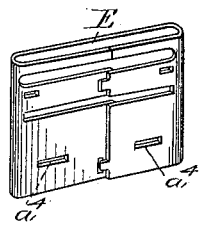
Figure 17:
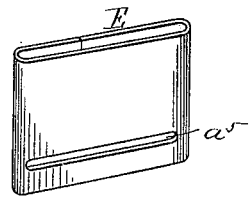
Figure 6:
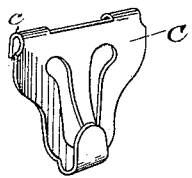
Figure 7:
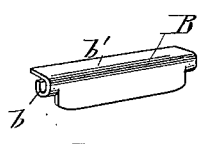
Figure 8:
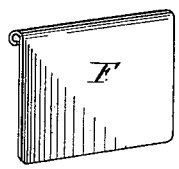
Figure 19:
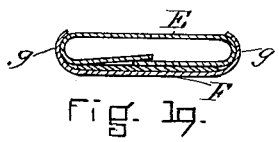
Figure 9:
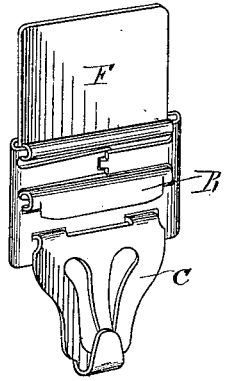

Referring to the drawings, Figure 1 is a view in plan of a blank from which the flattened sleeve portion of the device is made. Fig. 2 is a plan of a blank from which the hook, which may be used with the sleeve, is made. Fig. 3 is a plan of the blank from which the jaw of the device is made. Fig. 4 is a plan of the blank from which the covering-plate is made. Fig. 5 represents the blank shown in Fig. 1 bent to form a flattened sleeve. Fig. 6 represents the blank shown in Fig. 2 shaped to form a hook. Fig. 7 represents the blank shown in Fig. 3 formed to make a jaw. Fig. 8 shows the blank represented in Fig. 4 shaped to form a covering-plate. Fig. 9 is a perspective view of the device, the covering-plate being lifted to show the jaw, the hook, and the joints of the flattened sleeve. Fig. 10 is a view in perspective, showing it applied to a suspender-end, and with the covering-plate in place to conceal the jaw, the upper part of the hook, and inequalities upon the face of the flattened sleeve. Fig. 11 is a vertical section of the suspender represented in Fig. 10. Fig. 12 is a horizontal section through the flattened sleeve and suspender upon the line $x\ x$ of Fig. 11. Fig. 13 is a section upon the line $yy$ of Fig. 11. Fig. 14 is a view in perspective, illustrating the use of the flattened sleeve and protecting-plate without the hook, and when it is employed for lengthening or shortening a suspender-strap. Fig. 15 is a vertical section thereof. Fig. 16 is a view in perspective of the rear side of the devices represented in Fig. 14. Fig. 17 is a view illustrating the sleeve as provided with a slot, through which one end of the suspender is adapted to be passed. This form of sleeve is used with the suspender as represented in Figs. 14, 15, and 16. Fig. 18 represents the supplemental hinged plate as provided with side clasps, which close upon the edges of the main part of the sleeve to fasten the plate thereto; and Fig. 19 is a view in section upon the dotted line of Fig. 18.

In making the device I prefer to employ a flat blank, A, shaped in plan substantially as shown in Fig. 1. This blank has its edge $a$ formed to provide the ears or lugs $a'$. It also has the recesses $a^2$ extending from its edges to provide a slot or space for the reception of the jaw B, also the holes $a^3$ for the reception of the ears $b$, attached to the jaw; also, when a hook, C, is used, the holes $a^4$ for the reception of the ears $c$, attached to the hook, and when it is used for adjustment of the suspender-strap the blank is provided with a slot, $a^5$, to form a bar, $a^7$, over which the suspender-end D is passed before it is sewed to the remainder of the strap, to fasten it in place, as shown in Figs. 14, 15, and 16. The blank shown in Fig. 1 is not provided with this slot. The blank also has the holes $a^8$, for the reception of the ears $a'$, by which the two edges of the blank are secured together, and the arms $A'\ A^2$. The blank thus prepared is bent to form a flattened sleeve. (See Fig. 5.)

The jaw B, which is shaped from a blank of the shape substantially as represented in Fig. 3, is secured thereto, its ears $b$ extending through the holes $a^3$, its edge $b'$ entering the receiving-space E of the sleeve. This edge $b'$ is shown plain in Figs. 3 and 7 and serrated in other figures.

If a hook is used, it is provided with lugs or ears $c$, which are bent to enter the holes $a^4$, as represented in Fig. 9. To the upper ears or arms, $A'\ A^2$, there is secured a covering-plate, F, which is hinged to the ears or arms, and which drops down over the jaw and the upper end of the hook when used, and covers all the joints and inequalities upon that side of the sleeve, so that there shall be no projections or joints which can come in contact with the clothing of the user.

In use, when it is desired to move the sleeve upon the suspender-strap, the covering-plate is lifted and the jaw disengaged from the suspender, and after the movement of the sleeve is engaged again therewith and the plate returned to its original position to cover it.

It will be seen that all the joints and connections are formed upon one side of the sleeve, so that one covering-plate covers or conceals them all.

In Fig. 18 I have shown the protecting-plate as having an extension, g, on each edge, which forms the clasp or latch by which the protecting-plate is locked or secured to the sleeve, these latches or clasps bearing against the side and edges of the sleeve and holding the plate firmly in place thereto.

Having thus fully described my invention, I claim and desire to secure by Letters Patent of the United States—

1. A continuous adjustable sleeve for suspenders, &c., connected with or supporting a suspender end, jaw, or hook, having its meeting edges or joints on one side thereof, provided with a supplemental swinging or hinged plate attached to the sleeve for covering the said meeting edges or joints, and so as to prevent the clothing of the wearer from coming in contact therewith, substantially as described.

2. The adjustable sleeve for straps of suspenders or other articles, having its edges united by ears, a jaw extending across the said edges, and a hook also extending across the edges, and a supplemental covering-plate for covering the said edges, the jaw, and the upper edge of the hook, substantially as described.

3. A sleeve for suspender and other straps, made of flat metal bent or shaped to bring its principal joints on one side, adapted to support a suspender end, jaw, hook, or other device, and an independent covering-plate provided with a latching device or clasp for latching or fastening it to the sleeve, substantially as described.

THOMAS O. POTTER.

Witnesses:
F. F. RAYMOND, 2d,
FRED. B. DOLAN.